United States Patent Office 3,828,039
Patented Aug. 6, 1974

3,828,039
2-AMINO-THIENO[2,3-e][1,4]DIAZEPINE COMPOUNDS
Michio Nakanishi, Oita, and Tetsuya Tahara, Kazuhiko Araki, and Masami Shiroki, Yoshitomi-machi, Japan, assignors to Yoshitomi Pharmaceutical Industries, Ltd., Osaka, Japan
No Drawing. Filed Apr. 12, 1972, Ser. No. 243,435
Claims priority, application Japan, Apr. 14, 1971, 46/24,013
Int. Cl. A61k 27/00; C07d 63/12, 63/14
U.S. Cl. 260—247.1    16 Claims

ABSTRACT OF THE DISCLOSURE 2-amino-thieno[2,3-e][1,4]diazepine compounds of the general formula:

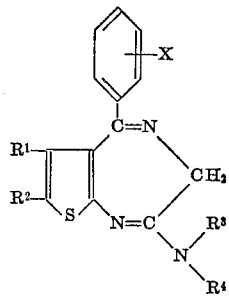

wherein X is H, halogen, methyl, methoxy or trifluoromethyl; each of $R^1$ and $R^2$ is H or $C_{1-4}$ alkyl, or $R^1$ and $R^2$ combinedly form $—(CH_2)_4—$; and $—N(R^3)(R^4)$ is amino, alkyl- or dialkyl-amino (alkyl being $C_{1-4}$ alkyl), 1-pyrrolidinyl, piperidino, morpholino or 4-methyl-1-piperazinyl; and pharmaceutically acceptable acid addition salts thereof, are useful as psychotropics.

---

This invention relates to novel and therapeutically valuable 2-amino-thieno[2,3-e][1,4]diazepine compounds of the general formula:

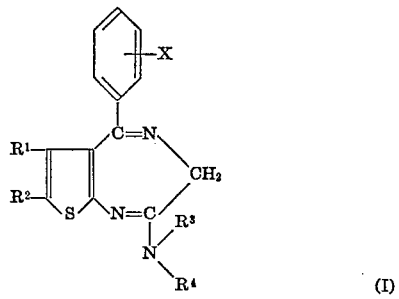

and pharmaceutically acceptable acid addition salts thereof, wherein X is H, halogen (e.g. F, Cl or Br), methyl, methoxy or trifluoromethyl; each of $R^1$ and $R^2$ is H or $C_{1-4}$ alkyl such as methyl, ethyl, propyl, butyl or isobutyl, or $R^1$ and $R^2$ combinedly form $—(CH_2)_4—$; and $$—N(R^3)(R^4)$$

is amino, alkyl- or dialkyl-amino (alkyl being $C_{1-4}$ alkyl), 1-pyrrolidinyl, piperidino, morpholino or 4-methyl-1-piperazinyl.

The compounds of general formula (I) can be produced by reacting a compound of the formula

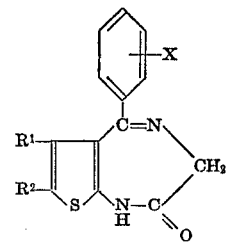

with a compound of the formula

The reaction is usually carried out in an inert solvent such as ether, tetrahydrofuran or dioxane, in the presence of a Lewis acid such as $TiCl_4$, $BF_3$, $SnCl_4$, $ZnCl_2$ or $AlCl_3$ as dehydrating catalyst, at a relatively low temperature (about $-10°$ C. to room temperature) for about 1 to 10 hours. The reaction can also be carried out (1) in an inert solvent such as dimethylformamide, dimethylacetamdie or diglyme, preferably in a pressure vessel such as an autoclave, at about 100 to 200° C., for about 5 to 10 hours, or (2) in an inert solvent such as benzene, toluene or xylene, in the presence of a catalyst such as p-toluenesulfonic acid, under heating, in order to remove continuously the water formed.

The starting compounds of formula (II) can be prepared, for example, by the method disclosed in published West German patent application OLS-2,107,356, namely by subjecting a compound of the formula

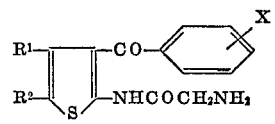

to intramolecular condensation.

The compounds of formula (I) can be converted into the corresponding acid addition salts in a conventional manner by treatment with various inorganic and organic acids, for example, hydrochloric, hydrobromic, nitric, sulfuric, citric, maleic, fumaric, succinic, oxalic and tartaric acid.

The compounds of formula (I) and the pharmaceutically acceptable acid addition salts thereof are excellent in anticonvulsant action, antimegimide effect, antitremorine action and reserpine potentiation. Some test results are shown below:

(1) ANTICONVULSANT ACTION

A test solution containing a test compound was intraperitoneally administered to one group of 6 dd-strain male mice each weighing 20–25 g. After an hour, a silver electrode of an electroshock seizure apparatus (designed by L. A. Woodbury et al.: see, Archives Internationales de Pharmacodynamie et de Therapie, vol. 42, pp. 72-102 (1952)) was brought into contact with the cornea and an alternating current (2000 volts, 12.5 milliamperes) was applied for 0.2 second to induce convulsion. The $ED_{50}$, the dose required to lower the seizure rate by 50% against the control mice, was determined from the dose-effect correlation curve.

(2) ANTIMEGIMIDE EFFECT

A test solution containing a test compound was orally administered to one group of 6 dd-strain male mice. After 15 minutes, a solution of 80 mg./kg. of megimide (β-ethyl-β-methyl-glutarimide) was subcutaneously administered. The $ED_{50}$, the dose required to prevent for 3 hours the death due to the tonic extensor convulsion induced by the administration of megimide in 50% of the test animals, was determined from the dose-effect correlation curve.

(3) ANTITREMORINE ACTION

A test solution containing a test compound was subcutaneously administered to one group of 6 dd-strain female mice. After 30 minutes, a solution of 15 mg./kg. of tremorine hydrochloride was intraperitoneally administered. Twenty minutes later, it was studied whether tremor and salivation were observed or not. The dose which was effective for half number of mice is represented as $ED_{50}$. The $ED_{50}$ was determined from the dose-effect correlation curve.

RESULTS

| Action | Compound | | | |
|---|---|---|---|---|
|  | A | B | C | D |
| Anticonvulsant action, $ED_{50}$, mg./kg | 12 | 12 | 7 | 9.5 |
| Antimegimide effect, $ED_{50}$, mg./kg | 3.7 | 4.2 | 13 | 3.5 |
| Antitremorine action, $ED_{50}$, mg./kg | 20 | 160 | 8 | 8.5 |

Compounds A to D are identified below:

(A) 2-dimethylamino-5-o-chlorophenyl-7-ethyl-3H-thieno[2,3-e][1,4]diazepine hydrochloride.
(B) 2-piperidino-5-o-chlorophenyl-7-ethyl-3H-thieno[2,3-e][1,4]diazepine dihydrochloride.
(C) 2-ethylamino-5-o-chlorophenyl-7-ethyl-3H-thieno[2,3-e][1,4]diazepine oxalate.
(D) 2-methylamino-5-o-chlorophenyl-7-ethyl-3H-thieno[2,3-e][1,4]diazepine hydrochloride.

In view of various tests, including those mentioned above, the compounds of the invention represented by formula (I) and pharmaceutically acceptable acid addition salts thereof can be safely administered as psychotropics for the treatment of nuerosis, psychosomatic disease, depression, epilepsy and schizophrenia, in the form of a pharmaceutical preparation with a suitable and conventional pharmaceutically acceptable carrier or adjuvant, administrable orally, without harm to the patients.

The pharmaceutical preparation can take any conventional form such as tablets, capsules or powders.

FORMULATION EXAMPLES (a) 10 mg. tablets are prepared from the following compositions:

| | Mg. |
|---|---|
| Compound (I) | 10 |
| Starch | 8.5 |
| Microcrystalline cellulose | 10 |
| Lactose | 50 |
| Methyl cellulose | 0.5 |
| Magnesium stearate | 1 |
| | 80 |

(b) 10% powders are prepared from the following compositions:

| | Percent by weight |
|---|---|
| Compound (I) | 10 |
| Lactose | 80 |
| Starch | 9.5 |
| Methyl cellulose | 0.5 |
| | 100 |

The daily dose of compound (I) or a salt thereof for human adults usually ranges from about 30 to 60 mg., in single or multiple dose, but it may be changed depending upon the age and/or symptoms of the patients.

The present invention will be better understood from the following examples which are illustrative and not limitative of the present invention.

EXAMPLE 1

Dry ammonia gas is introduced to a solution of 6.0 g. of 5-o-chlorophenyl-7-ethyl-1,2-dihydro-3H-thieno[2,3-e][1,4]diazepin-2-one in 180 ml. of anhydrous tetrahydrofuran, at −5° to 0° C., and 20 minutes later 70 ml. of a tetrahydrofuran solution containing 2.0 g. of $TiCl_4$ is added dropwise over a period of 20 minutes. The whole mixture is stirred under the introduction of ammonia gas at 0° to 5° C. for 2 hours, and then, without the ammonia introduction, at room temperature for 2 hours. Then 12 ml. of water is added to the reaction mixture, the aqueous mixture is stirred for 10 minutes, the insoluble matter is filtered off, and the filtrate is concentrated under reduced pressure. Ethanol (50 ml.) is added to the residue, the ethanolic solution is heated for a short time, and the crystalline insoluble matter is collected by filtration. The crude crystalline product is recrystallized from a mixture of ethanol and chloroform to give 1.2 g. of 2-amino-5-o-chlorophenyl - 7 - ethyl - 3H - thieno[2,3-e][1,4]diazepine as pale yellow crystals, melting at 247–248° C.

EXAMPLE 2

6.0 g. of 5-o-chlorophenyl - 7 - ethyl - 1,2 - dihydro-3H-thieno[2,3-e][1,4]diazepin-2-one is dissolved in 150 ml. of a tetrahydrofuran solution containing 25 g. of dimethylamine, 80 ml. of a tetrahydrofuran solution containing 2.5 g. of $TiCl_4$ is added dropwise over a period of 20 minutes under ice-cooling, and the whole mixture is stirred at room temperature for 6 hours. Then 15 ml. of water is added to the reaction mixture, the aqueous mixture is stirred for 10 minutes, the insoluble matter is removed by suction filtration, and the filtrate is concentrated under reduced pressure. The oily residue is dissolved in ethyl acetate, the organic solution is washed well with water, and dried over sodium sulfate, the solvent is distilled off under reduced pressure, and then hot ligroin is added to the remaining oil. After cooling the ligroin solution, the precipitated insoluble matter (unreacted starting compound) is filtered off, and the filtrate is concentrated to give 4.2 g. of 2-dimethylamino-5-o-chlorophenyl-7-ethyl-3H-thieno[2,3-e][1,4]diazepin as pale yellow oil. This oil is dissolved in ethyl acetate, and an equimolar amount of 30% ethanolic hydrochloric acid is added. The crystals precipitated are collected by filtration, and recrystallized from a mixture of ethyl acetate and ethanol to give the corresponding hydrochloride as yellow powder, melting at 249–250° C. with decomposition.

EXAMPLE 3

6.0 g. of 5-o-chlorophenyl - 7 - ethyl - 1,2 - dihydro-3H-thieno[2,3-e][1,4]diazepin-2-one is dissolved in 150 ml. of a tetrahydrofuran solution containing 20 g. of methylamine, 60 ml. of a tetrahydrofuran solution containing 2.0 g. of $TiCl_4$ is added dropwise over a period of 20 minutes under ice-cooling, and the whole mixture is stirred at room temperature for 4 hours. Then 60 ml. of hot ethanol is added to the reaction mixture, the ethanolic mixture is stirred for a short time, and the insoluble matter is collected by filtration. This solid is recrystallized from a mixture of ethanol and chloroform to give 5.1 g. of 2-methylamino - 5 - o - chlorophenyl-7-ethyl-3H-thieno-[2,3-e][1,4]diazepine as pale yellow crystals, melting at 216–217° C. The corresponding hydrochloride melts at 232–234° C.

EXAMPLE 4

To a solution of 6.0 g. of 5-o-chlorophenyl-7-ethyl-1,2-dihydro-3H-thieno[2,3-e][1,4]diazepin-2-one and 25 g. of piperidine in 120 ml. of tetrahydrofuran is added dropwise 80 ml. of a tetrahydrofuran solution containing 2.5 g. of $TiCl_4$ under ice-cooling for a period of 20 minutes, and the whole mixture is stirred at room temperature for 2 hours. Then 10 ml. of water is added to the reaction mixture, the aqueous mixture is stirred for 10 minutes, the insoluble matter is removed by suction filtration, and the filtrate is concentrated under reduced pressure. The remaining oil is dissolved in ethyl acetate, the organic solution is washed well in order to remove the excess piperidine, and dried over sodium sulfate, and the solvent is distilled off under reduced pressure. Thus is obtained 7.0 g. of almost pure 2 - piperidino-5-o-chlorophenyl-7-ethyl-3H-thieno[2,3-e][1,4]diazepine as red oil. This product is converted into the corresponding hydrochloride by treatment with an excess ethanolic hydrochloric acid, and the crude salt thus obtained is recrystallized from a mixture of ethyl acetate and ethanol to give the dihydrochloride as yellow crystalline powder. This product damps at 96–120° C. with foaming due to thermal elimination of one mole of hydrogen chloride under formation of the monohydrochloride, which melts transparently at 190–192° C.

Using the procedure set forth in the above examples, but substituting equivalent amounts of the appropriate starting materials, the following compounds are also produced:

What is claimed is:

1. A 2-amino-thieno[2,3-e][1,4]diazepine compound of the general formula:

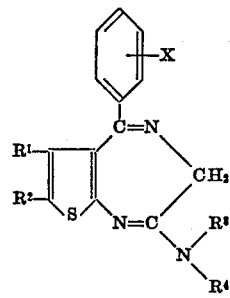

wherein X is H, halogen, methyl, methoxy or trifluoromethyl; each of $R^1$ or $R^2$ is H or $C_{1-4}$ alkyl, or $R^1$ and $R^2$ combined form —$(CH_2)_4$—; and —$N(R^3)(R^4)$ is amino, alkyl- or dialkyl-amino (alkyl being $C_{1-4}$ alkyl), 1-pyrrolidinyl, piperidino, morpholino or 4-methyl-1-piperazinyl; and a pharmaceutically acceptable acid addition salt thereof.

2. The compound of Claim 1: 2-amino-5-o-chlorophenyl-7-ethyl-3H-thieno[2,3-e][1,4]diazepine.

3. The compound of Claim 1: 2-dimethylamino-5-o-chlorophenyl-7-ethyl-3H-thieno[2,3-e][1,4]diazepine.

4. The compound of Claim 1: 2-methylamino-5-o-chlorophenyl-7-ethyl-3H-thieno[2,3-e][1,4]diazepine.

5. The compound of Claim 1: 2-piperidino-5-o-chlorophenyl-7-ethyl-3H-thieno[2,3-e][1,4]diazepine.

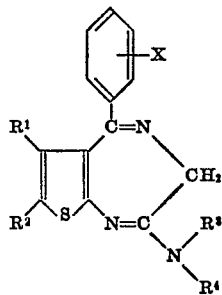

| Example No. | $R^1$ | $R^2$ | —$N(R^3)(R^4)$ | X | Melting Point (° C.) |
|---|---|---|---|---|---|
| 5 | H | Ethyl | Ethylamino | o-Cl | Base: 188–190; oxalate, 186–187*. |
| 6 | H | Methyl | Methylamino | o-Cl | Base: 241–243. |
| 7 | Methyl | do | do | H | Base: 275–278. |
| 8 | H | Ethyl | do | H | Base: 243–245. |
| 9 | H | do | Propylamino | o-Cl | Base: 174–176. |
| 10 | H | do | Butylamino | o-Cl | Base: 165–168. |
| 11 | H | do | Dimethylamino | H | Base: 141–143. |
| 12 | H | do | 1-pyrrolidinyl | o-Cl | Base: 140–142. |
| 13 | —$(CH_2)_4$— | | do | o-Cl | Base: 211–213. |
| 14 | H | Ethyl | 4-methyl-1-piperazinyl | o-Cl | Dimaleate: 156–158*. |
| 15 | H | do | Morpholino | o-Cl | Dihydrochloride: 167–170. |
| 16 | H | do | Methylamino | m-$CF_3$ | |
| 17 | H | do | do | o-$CH_3$ | |
| 18 | H | do | do | o-$CH_3O$ | |

*Decomposition.

Although the present invention has been adequately discussed in the foregoing specification and examples included therein, one readily recognizes that various changes and modifications may be made without departing from the spirit and scope thereof.

6. The compound of Claim 1: 2-ethylamino-5-o-chlorophenyl-7-ethyl-3H-thieno[2,3-e][1,4]diazepine.

7. The compound of Claim 1: 2-methylamino-5-o-chlorophenyl-7-methyl-3H-thieno[2,3-e][1,4]diazepine.

8. The compound of Claim 1: 2-methylamino-5-phenyl-6,7-dimethyl-3H-thieno[2,3-e][1,4]diazepine.

9. The compound of Claim 1: 2-methylamino-5-phenyl-7-ethyl-3H-thieno[2,3-e][1,4]diazepine.

10. The compound of Claim 1: 2-propylamino-5-o-chlorophenyl-7-ethyl-3H-thieno[2,3-e][1,4]diazepine.

11. The compound of Claim 1: 2-butylamino-5-o-chlorophenyl-7-ethyl-3H-thieno[2,3-e][1,4]diazepine.

12. The compound of Claim 1: 2-dimethylamino-5-phenyl-7-ethyl-3H-thieno[2,3-e][1,4]diazepine.

13. The compound of Claim 1: 2-(1-pyrrolidinyl)-5-o-chlorophenyl-7-ethyl-3H-thieno[2,3-e][1,4]diazepine.

14. The compound of Claim 1: 2-(1-pyrrolidinyl)-5-o-chlorophenyl - 6,7,8,9 - tetrahydro - 3H - [1]benzothieno[2,3-e][1,4]diazepine.

15. The compound of Claim 1: 2-(4-methyl-1-piperazinyl)-5-o-chlorophenyl-7-ethyl - 3H - thieno[2,3-e][1,4]diazepine.

16. The compound of Claim 1: 2-morpholino-5-o-chlorophenyl-7-ethyl-3-H-thieno[2,3-e][1,4]diazepine.

References Cited

UNITED STATES PATENTS

| | | | |
|---|---|---|---|
| 3,669,959 | 6/1972 | Hromatka et al. | 260—239.3 |
| 3,558,606 | 1/1971 | Tinney | 260—239.3 |
| 3,121,075 | 2/1964 | Keller et al. | 260—239 |
| 3,120,521 | 2/1964 | Sternbach et al. | 260—244 |
| 3,678,036 | 7/1972 | Archer et al. | 260—239 |

FOREIGN PATENTS

| | | | |
|---|---|---|---|
| 1,225,677 | 3/1971 | Great Britain | 260—239 |

HENRY R. JILES, Primary Examiner

C. M. S. JAISLE, Assistant Examiner

U.S. Cl. X.R.

260—268 BC, 293.57, 326.55 A, 326.81, 329 F, 332.3 P, 332.5; 424—248, 250, 267, 274, 275